Dec. 6, 1949 G. LEVESQUE DU ROSTU 2,490,641
LOAD RESPONSIVE RELAY FOR THE CONTROL OF BRAKES
Filed July 20, 1945 4 Sheets-Sheet 1
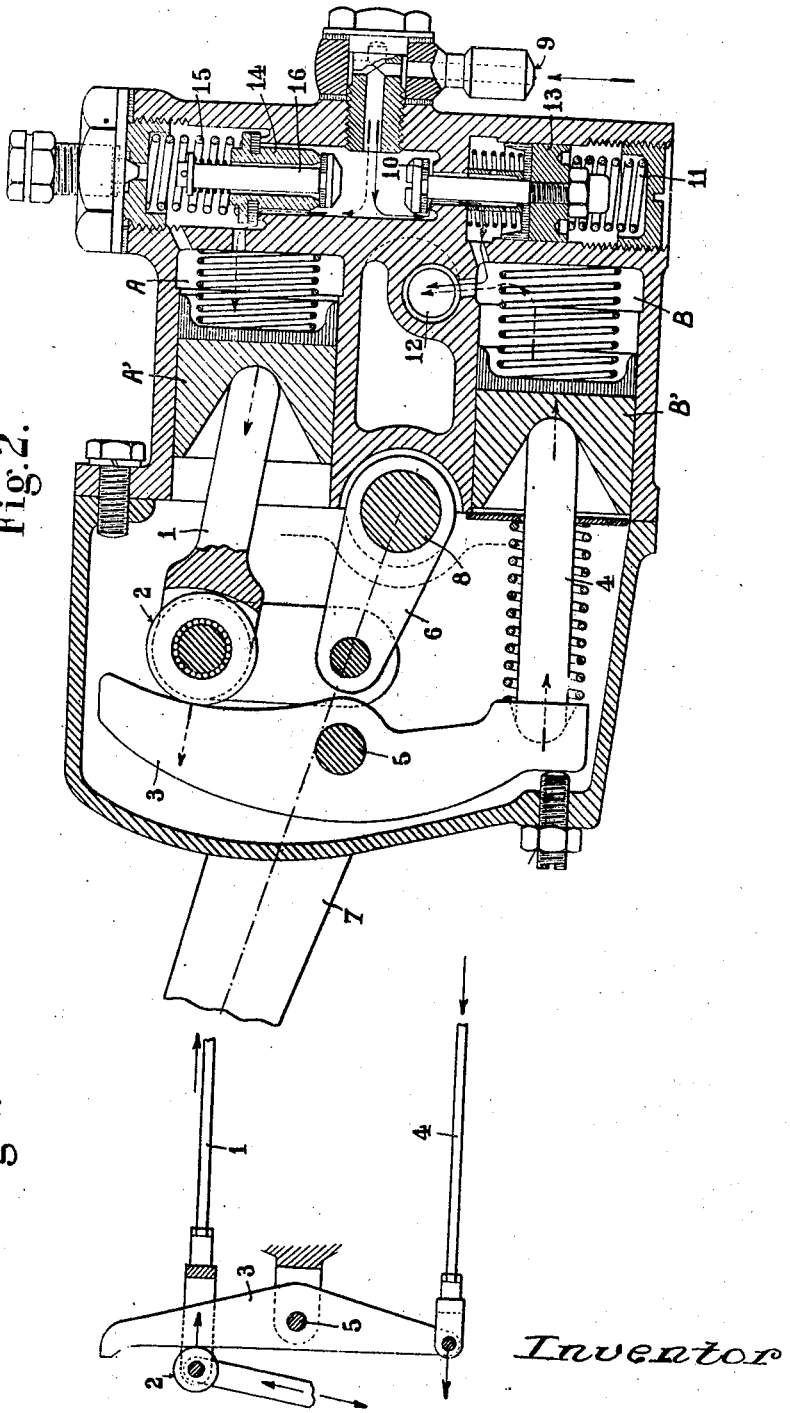
Inventor
G. Levesque du Rostu Dec. 6, 1949  G. LEVESQUE DU ROSTU  2,490,641
LOAD RESPONSIVE RELAY FOR THE CONTROL OF BRAKES
Filed July 20, 1945  4 Sheets-Sheet 2

Inventor
G. Levesque du Rostu

Dec. 6, 1949   G. LEVESQUE DU ROSTU   2,490,641
LOAD RESPONSIVE RELAY FOR THE CONTROL OF BRAKES
Filed July 20, 1945   4 Sheets-Sheet 3
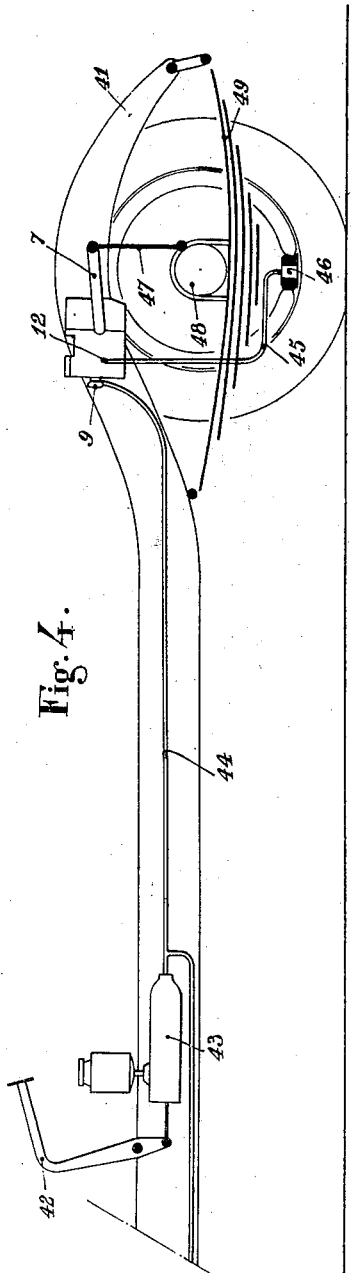
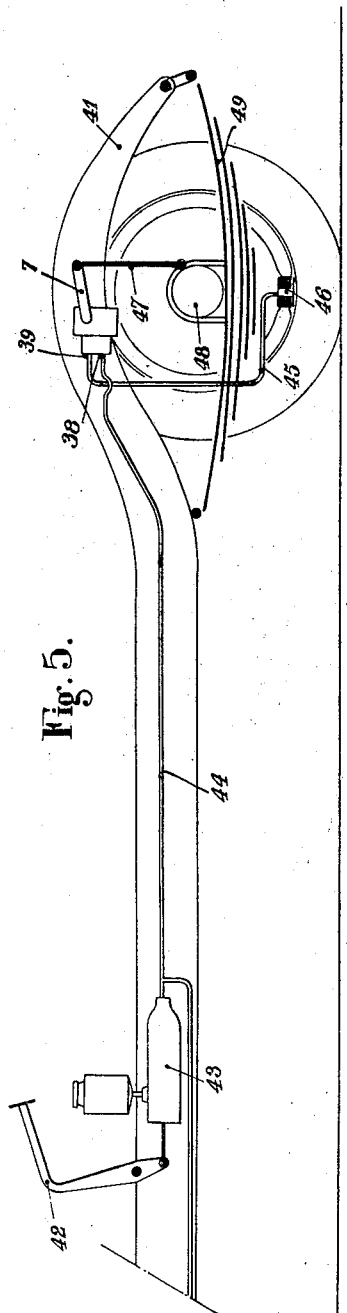
Inventor
G. Levesque du Rostu

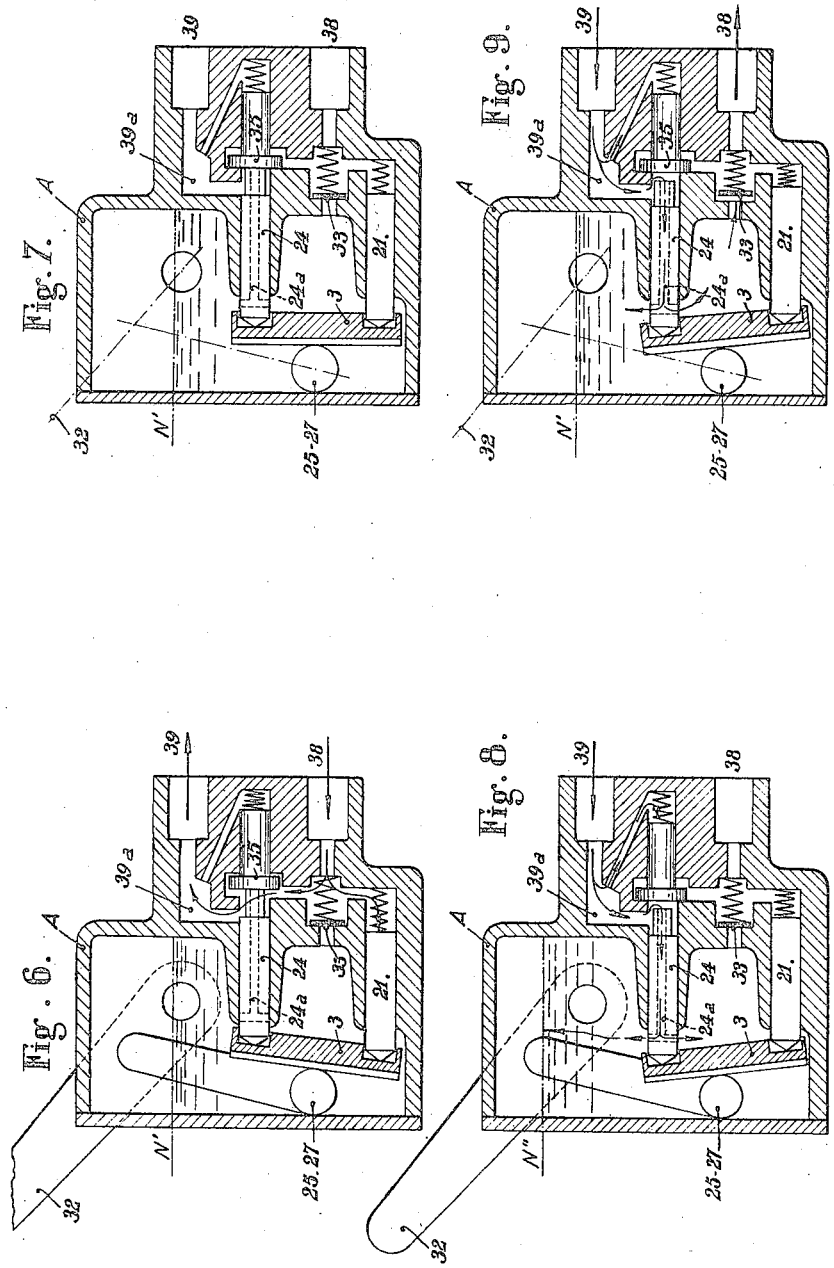

Patented Dec. 6, 1949

2,490,641

UNITED STATES PATENT OFFICE 2,490,641

LOAD RESPONSIVE RELAY FOR THE CONTROL OF BRAKES

Georges Levesque du Rostu, Paris, France, assignor to Societe Anonyme Andre Citroen, Paris, France Application July 20, 1945, Serial No. 606,223
In France May 8, 1943

Section 1, Public Law 690, August 8, 1946
Patent expires May 8, 1963

2 Claims. (Cl. 188—195)

My invention has for its object a transmission relay for the actuation of hydraulic brakes which is intended to permanently and automatically vary the braking action exerted upon each wheel or wheel pair equipped with such a relay in dependency on the load supported by said wheel or wheel pair.

According to my invention, such a result is secured by permanently varying the braking action in dependency on the sag of the related carrying springs, which sag itself is dependent on the load.

With this end in view, the force applied by the driver upon the brake-actuating member is transmitted to each wheel or wheel pair through a liquid-filled pipe in which a relay is interposed. The said relay comprises a two-arm lever interposed between two liquid-operated members. The arm lengths of said lever is varied in dependency on the sag of the spring assigned to the wheel concerned, or of the springs assigned to the wheel pair concerned, which sag controls the displacement of the fulcrum of said lever.

Two embodiments of the invention will be described hereinafter by way of example, reference being had to the appended drawings in which:

Figure 1 is a diagram illustrating the known mechanical principle;

Figure 2 shows in longitudinal section a transmission relay for a hydraulic device;

Figures 4 and 5 show the installation of the devices represented in Figures 2 and 3 respectively on the rear part of a vehicle;

Figures 6 to 9 are diagrammatic views in longitudinal section illustrating the operation of the embodiment shown in Figure 3.

Figure 3:
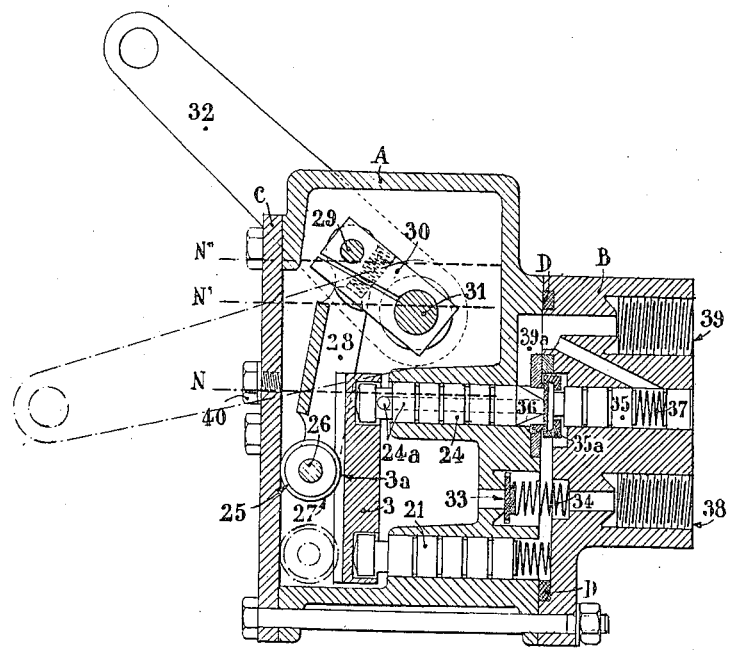
Figure 3 is a longitudinal section of a second type of transmission device.

The operation of the mechanical system diagrammatically represented in Figure 1 will first be briefly summarized.

The force applied to the braking control member is transmitted by a rod 1 to a roller 2, which is adapted to move along a lever 3, which transmits the force to a rod 4 controlling the brakes of a wheel or of an axle.

The movement of the roller 2 along the lever 3 is controlled by the bending of the suspension spring, in such a manner that the distance of the contact point of the roller 2 from the axis 5 of the lever 3 is proportional to the load carried by the spring. This condition being fulfilled, it is obvious that the force transmitted to the rod 4, and therefore the braking pressure applied to the wheel in question will be proportional to the load carried by the wheel.

The first embodiment of the present invention, as illustrated in Figure 2, is applicable to brakes with hydraulic transmission.

Each of the relays consists of a cylinder casing comprising a receiving piston A' moving in a cylinder A and a transmitting piston B' moving in a cylinder B, mechanically connected by the rod 1, the roller 2, the lever 3 pivoting about the axis 5, and the rod 4.

The position of the roller 2 on the lever 3 is controlled by a lever 6 moved by an outer lever 7 mounted on the same axis 8. The position of the lever 7 is determined by the deflection of the suspension spring or springs.

The operation of the apparatus is effected in two stages:

*1st stage.*—The liquid comes from the master cylinder through a connecting pipe 9, and passes through a valve 10, which is kept open by a spring 11. It enters a cylinder B, where it produces no action, and flows out through a connecting pipe 12, and is thereafter directed to the brake cylinders in which, at the ends of the pipe systems, its pressure is transmitted to the brake shoes. The brake shoes are thus brought into contact with the brake drums. While the action of the master cylinder continues, the pressure increases, and as soon as it reaches a certain value, it forces back the piston 13, against the pressure of the spring 11, and the valve 10 closes.

*2nd stage.*—As a result of a small increase of pressure, the valve 14 is forced back against the thrust of the spring 15, and the pressure acts on the piston A'. The total force applied by the liquid to the piston A' is transmitted by the members 1, 2, 3 and 4 to the piston B', but its magnitude is modified proportionally to the value of the variable arm of the lever 3, and the pressure thus produced in the cylinder B is transmitted through the pipe 12 to the brake cylinders. Proportionality between the load carried by the wheel and the braking force acting on same is therefore obtained.

When the action on the master cylinder ceases, the liquid pressure in the pipe decreases. The piston B' forces back the piston A' through the medium of the lever 3, and the liquid returns from the cylinder A to the connection pipe 9, the return valve 16 being forced back. When the pressure in the cylinder B becomes lower than that established for the closing of the valve 10, the spring 11 forces back the piston 13, and the valve 10 is opened for the passage of liquid from the cylinder B towards the main pipe 9.

The main advantages of the system according to the present invention are the following:

(1) Whatever may be the weight of the vehicle, the position of the load carried, the height of the load, the road gradient and the decrease of speed imparted to the vehicle, the braking force is distributed between the wheels or axles at every moment in proportion to the load carried by each wheel or axle at the moment under consideration. It therefore follows that the maximum possible decrease of speed, limited by adhesion to the ground, can be attained in all cases without blocking the wheels. The risk of skidding by blocking the rear wheels, and of loss of steering control by blocking the front wheels, are thus eliminated.

(2) As explained previously, the maximum decrease of speed being obtained at the limit of adhesion of all the wheels of the vehicle, it will be seen that all the energy developed for braking is utilized, whereas with the braking transmissions now in use, when one or more wheels become blocked, it is necessary to continue increasing the braking force on these wheels to no useful purpose until the limit of adhesion of the other wheels is reached.

(3) The total force to be applied for braking a given vehicle is proportional solely to the decrease in speed to be obtained, whether the vehicle be empty or loaded.

(4) In the case where the invention is applied to a hydraulic brake transmission such as that described, the apparatus enables the effort produced by the driver to be diminished without either decreasing the useful volume of the master cylinder or substantially increasing the stroke of the pedal. It is sufficient either to provide in the design a receiving piston A' of a greater cross-sectional area than the transmitting piston B', or to decrease the length of the non-variable arm of the lever 3.

Figure 4 shows how the device represented in Figure 2 may be installed at the rear part of the underframe 41 of a car. Such a device may alternatively be installed in an analogous manner on the front part of the underframe. 42 denotes the brake pedal, actuating the piston of the master cylinder 43. The latter is connected by a pipe 44 to the union 9 of each of the appliances. The union 12 of each of the latter is connected by a pipe 45 to the cylinder 46 of the wheel brakes. The lever 7 of each device is connected by a link 47 to the corresponding axle 48, in such a way that the variations in the deflection of the suspension spring 49 caused by the variations of load cause coresponding variations in the angular position of this lever 7, and therefore in the braking effort.

In the second solution proposed, which is represented by Figure 3, the hydraulic pressure transmitted to the brakes of a wheel or of an axle is regulated in proportion to the pressure created by the driver of the vehicle in the main pipe, and likewise in proportion to the load supported by the wheel or axle, by a system of valves hereinafter described.

The relay is composed of a casing A, a cover B, and a closing plate C. These three members are held tightly together by means of bolts, a rubber joint D being inserted between the casing A and the cover B, and a paper joint between the cover A and the closing plate C.

In the casing A are slidably mounted pistons 21 and 24, which are connected with one another by the lever 3, the fulcrum of which is formed by the line of contact of said lever 3 with the two rollers 25 mounted on the same shaft 26, one on each side of a roller 27, which bears against the closing plate C. The rollers 25 are of smaller diameter than the roller 27, so that they do not come into contact with the plate C. The lever 3 is chanelled or hollowed out by an amount corresponding to the width of the roller 27, to prevent the latter from running thereon.

The shaft 26 carrying the rollers is mounted on a double link 28, pivoted at 29 on an internal lever 30, unitary with a control shaft 31, which in its turn is unitary with an outer lever 32, receiving its motion, between the position shown in full lines and that shown in dotted lines in Figure 3, from the movements of the suspension of the wheel or axle which is to be braked.

In the casing A, provision is also made for housing a return valve 33, which is held in position by a loaded spring 34. The cover B is provided with a balanced valve 35, pressed against a seat 36 by means of a spring 37.

In the cover B there is a taped opening 38, serving as a pipe union for a tube connecting the apparatus to the master cylinder of the braking installation, and also a tapped opening 39 for the connection of a pipe leading to the cylinders controlling the brake shoes.

A plug 40 on the cover plate C, enables the level N of the liquid to be controlled during filling. The position of this plug is determined in such a manner that the level N' at normal operating pressure, that is, at the residual pressure usually maintained in hydraulic braking installations, will be at the level of the control shaft 31, to permit of the latter being lubricated.

The liquid tightness of the passage of the control shaft 31 through the casing A is ensured by the use of known means, such as an india-rubber cup, a stuffing-box or the like.

This relay operates as follows: the opening 38 being connected to the master cylinder and the opening 39 to the wheel cylinders, the pipes being full of liquid at a pressure of 800 grammes per square centimetre, and the level of the liquid at this pressure in the casing A being at N', the lever 32, and therefore the rollers 25 and 27, are in a position corresponding to a given load. The valves 33 and 35 are bearing on their seats.

If a certain pressure P is created, by means of the master cylinder, in the pipe coupled at 38, this pressure immediately blocks the valve 33 and impels the piston 21 forward, which causes the lever 3 to rock about its line of contact 3a with the rollers 25, as shown in Figure 6. The lever 3, in its movement, pushes back the piston 24, and the latter pushes open the valve 35, which was originally pressed by the spring 37 on to its seat 36. At this moment the liquid can therefore pass into the brake pipe connected at 39. The pressure that is set up in this pipe is likewise transmitted through a duct to the right-hand end of the valve 35 at which the spring 37 is situated. At this juncture the lever 3 is subjected to two forces, the first acting upon the piston 21, and the second acting upon the valve 35, which is bearing upon the piston 24.

When the moments of these forces are equal, the lever 3 resumes its initial position, whereupon the valve 35 interrupts the communication between the pipe unions 38 and 39, this being the position represented in Figures 3 and 7.

It will be readily understood that if the roller 25 is located exactly half way between the two pistons, the initial position will be obtained when the pressure in the pipe 39 is equal to that in the pipe 38, assuming that the diameters of the pistons are equal. If the roller is at one-third of the distance between the axes of the pistons, starting from the piston 21, the return to the initial position is effected as soon as the pressure in the pipe 39 is one-half of that prevailing in the pipe 38. To each position of the roller, therefore, there corresponds a definite ratio between the pressures in the pipes 38 and 39.

If the braking pressure established by the driver in the pipe 38 is reduced by a certain amount, equilibrium is upset in favour of the piston 24. The valve 35 cannot move towards the left, as it is already bearing upon its seat 36, but the pressure in the pipe 39a acts upon the piston 24 over an area comprised between its outer circumference and the bearing circumference of the piston 24 upon the packing 35a of the valve 35, as shown in Figure 8. The displacement of the piston 24 towards the left therefore allows the liquid in the pipe 39 to flow into the casing A through a duct 24a provided in the interior of the piston 24. This has the effect of lowering the pressure in the pipe 39 to the normal equilibrium value, where there will again be bearing of the piston 24 upon the fluidtight packing 35a.

The liquid, in flowing into the casing, causes the level in the latter to rise from N' to N''.

If it is desired to release the brake completely, all that is necessary is to discontinue the pressure at 38 by releasing the brake pedal. When this is done the conditions are as represented in Figure 9, the piston 24 moves to the left, liquid flows into the casing, and since the pressure in the latter becomes greater than that prevailing in the pipe 38, the valve 33 is lifted, the level falls back to N', and everything reverts to the initial position, represented in Figure 3 or 7.

The mounting of this latter apparatus upon a vehicle is illustrated in Figure 5. The description of the operation of the connection is identical with that of Figure 4.

What I claim as my invention and desire to secure by Letters Patent is:

1. In a vehicle provided with suspension springs, the provision of a control relay for the brakes including for each front and rear brake arrangement, a pivoting lever, hydraulic control means adapted to act on one arm of said lever with a pressure adapted to vary in accordance with requirements, a hydraulic transmission between the other arm of said lever and the corresponding brake, a passage for the hydraulic medium common to the control means and the hydraulic transmission and means controlled by the variations in sag of the suspension springs of the vehicle for displacing the point of engagement of the hydraulic control means with reference to the pivot of the lever in conformity with said modifications of sag.

2. In combination with a vehicle suspension and with an hydraulic braking device including as usual a master cylinder, a brake cylinder, controlling means and a connecting pipe-line between said master cylinder and said brake cylinder, a transmission relay for proportioning the braking force to the load carried by said suspension comprising a chamber on said pipe-line, said chamber being so connected with said brake cylinder, a valve adapted to close said pipe-line between said cylinder and the master cylinder of said hydraulic braking device, said valve being operatable between a closed position and an open position, resilient means for keeping said valve in open position, a first cylinder formed as a part of said chamber, a first piston rigid with said valve reciprocating in said first cylinder and adapted to close said valve against the pressure of said resilient means when hydraulic pressure in said chamber has reached a pre-determinate value, a second cylinder formed as another part of said chamber, a second piston adapted to reciprocate in said second cylinder, an auxiliary cylinder connected with said pipe line, an admission valve for admitting fluid from said pipe-line to said auxiliary cylinder, resilient means for keeping said admission valve in closed position, a return back valve for returning fluid from said cylinder to said pipe-line, resilient means for keeping said return back valve in closed position, an auxiliary piston adapted to reciprocate in said auxiliary cylinder, a mechanical system connecting said second piston and said auxiliary piston for transmitting force from the one to the other with a varying ratio, said varying ratio being controlled by said suspension.

GEORGES LEVESQUE du ROSTU.

REFERENCES CITED

The following references are of record in the file of this patent:

UNITED STATES PATENTS

| Number | Name | Date |
|---|---|---|
| 1,720,268 | Farmer | July 9, 1929 |
| 2,001,327 | Johnson | May 14, 1935 |
| 2,162,114 | Oliver | June 13, 1939 |
| 2,178,144 | Lower | Oct. 31, 1939 |
| 2,270,366 | Wolf | Jan. 20, 1942 |